(12) United States Patent
Collins et al.

(10) Patent No.: US 7,068,169 B2
(45) Date of Patent: Jun. 27, 2006

(54) USE OF A SUBCARRIER IN AN ORGANIC SEMICONDUCTOR RADIO FREQUENCY IDENTIFICATION SYSTEM

(75) Inventors: Timothy J. Collins, Lockport, IL (US); Patrick L. Rakers, Kildeer, IL (US)

(73) Assignee: Motorola, Inc., Schaumburg, IL (US)

( * ) Notice: Subject to any disclaimer, the term of this patent is extended or adjusted under 35 U.S.C. 154(b) by 4 days.

(21) Appl. No.: 10/455,208

(22) Filed: Jun. 5, 2003

(65) Prior Publication Data

US 2004/0246134 A1 Dec. 9, 2004

(51) Int. Cl.
*G08B 13/14* (2006.01)

(52) U.S. Cl. .............................. 340/572.1; 340/825.71; 340/825.73; 340/825.76; 375/275; 375/326; 375/335

(58) Field of Classification Search ............. 340/572.4, 340/10.1
See application file for complete search history.

(56) References Cited

U.S. PATENT DOCUMENTS

| 5,345,231 | A | * | 9/1994 | Koo et al. ............. 340/870.31 |
| 6,084,530 | A | * | 7/2000 | Pidwerbetsky et al. .. 340/10.32 |
| 6,133,835 | A | * | 10/2000 | De Leeuw et al. ...... 340/572.5 |
| 6,204,764 | B1 | * | 3/2001 | Maloney .................. 340/568.1 |
| 6,456,668 | B1 | * | 9/2002 | MacLellan et al. ......... 375/283 |

* cited by examiner

*Primary Examiner*—Benjamin C. Lee
*Assistant Examiner*—Son Tang

(57) ABSTRACT

A radio frequency identification system comprising a radio reader circuit operable to emit a radio frequency carrier signal modulated with a subcarrier, which has a subcarrier modulation rate. The radio frequency identification tag circuit is operable to extract the subcarrier from the emitted radio frequency carrier signal and the extracted subcarrier then functions as a clock, which operates to assist in the transfer of a modulated backscattered signal to the radio frequency identification reader circuit. The radio frequency identification reader circuit decodes the modulated backscattered signal and the data encoded in the radio frequency identification tag circuit is obtained.

18 Claims, 2 Drawing Sheets

USE OF A SUBCARRIER IN AN ORGANIC SEMICONDUCTOR RADIO FREQUENCY IDENTIFICATION SYSTEM

FIELD OF THE INVENTION

This invention relates generally to radio frequency identification system where a subcarrier modulated carrier signal emitted from a reader. More specifically an organic semiconductor tag extracts the subcarrier from the modulated carrier signal to be used as a clock by the organic semiconductor tag.

BACKGROUND OF THE INVENTION

Radio frequency identification systems are used to track inventory, equipment and living things. If the radio frequency identification tag is low cost it can be attached to all products in a store to replace the bar code scanning system. Current bar code scanner technology requires a customer to wait, often in line, while their packages are scanned by a bar code scanning system. It is simpler for vendors and consumers to use a radio frequency identification system, in which a consumer will carry groceries out of a store without going through a check out process. A charge for the purchased items will be applied to the consumer's credit card when they walked out the store door past a radio frequency identification reader and the store inventory will be modified to reflect the purchases. Currently, the cost of radio frequency identification tags is too high to be cost effective to apply one to all products in a grocery store. The prior art utilizes a silicon memory chip in the radio frequency identification tag circuit along with other radio frequency front-end devices.

It is desirable to have a low cost radio frequency identification tag to be used in a passive radio frequency identification system.

SUMMARY OF THE INVENTION

One aspect of the present invention provides a radio frequency identification system including a radio frequency identification reader circuit operable to emit a radio frequency carrier signal modulated with a subcarrier, which has a subcarrier modulation rate. The radio frequency identification tag circuit is operable to extract the subcarrier from the emitted radio frequency carrier signal and the extracted subcarrier then functions as a clock, which operates to assist in the transfer of a modulated backscattered signal to the radio frequency identification reader circuit. The radio frequency identification reader circuit decodes the modulated backscattered signal and the data encoded in the radio frequency identification tag circuit is obtained.

A second aspect of the present invention is a method of operating a radio frequency identification system by emitting from a radio frequency identification reader a radio frequency carrier signal modulated by a subcarrier which has a subcarrier modulation rate and extracting the subcarrier from the emitted radio frequency carrier signal by a first portion of a radio frequency identification tag circuit to obtain a clock signal. Then data stored on a second portion of the radio frequency identification tag circuit is extracted by synchronizing the clock signal to the stored data. The extracted data is transmitted to the radio frequency identification reader from the radio frequency identification tag circuit on a modulated backscattered signal.

A third aspect of the present invention is a radio frequency identification tag, which has a first circuit that receives a subcarrier modulated radio frequency carrier signal. The first circuit extracts a subcarrier signal from the received subcarrier modulated radio frequency carrier signal to form a clock signal. A second circuit operates to utilize the clock signal to extract data stored on the radio frequency identification tag by synchronizing the clock signal to the stored data. The first circuit and the second circuit are in electrical communication.

The forgoing system and other system as well as features and advantages of the present invention will become further apparent from the following detailed description of the presently preferred embodiments, read in conjunction with the accompanying drawings. The detailed description and drawings are merely illustrative of the present invention rather than limiting, the scope of the present invention being defined by the appended claims and equivalents thereof.

BRIEF DESCRIPTION OF THE DRAWINGS

The present invention is illustrated by way of example and not limitation in the accompanying figures, in which like references indicate similar elements, and in which.

DETAILED DESCRIPTION OF THE PRESENTLY PREFERRED EMBODIMENT

Figure 1:
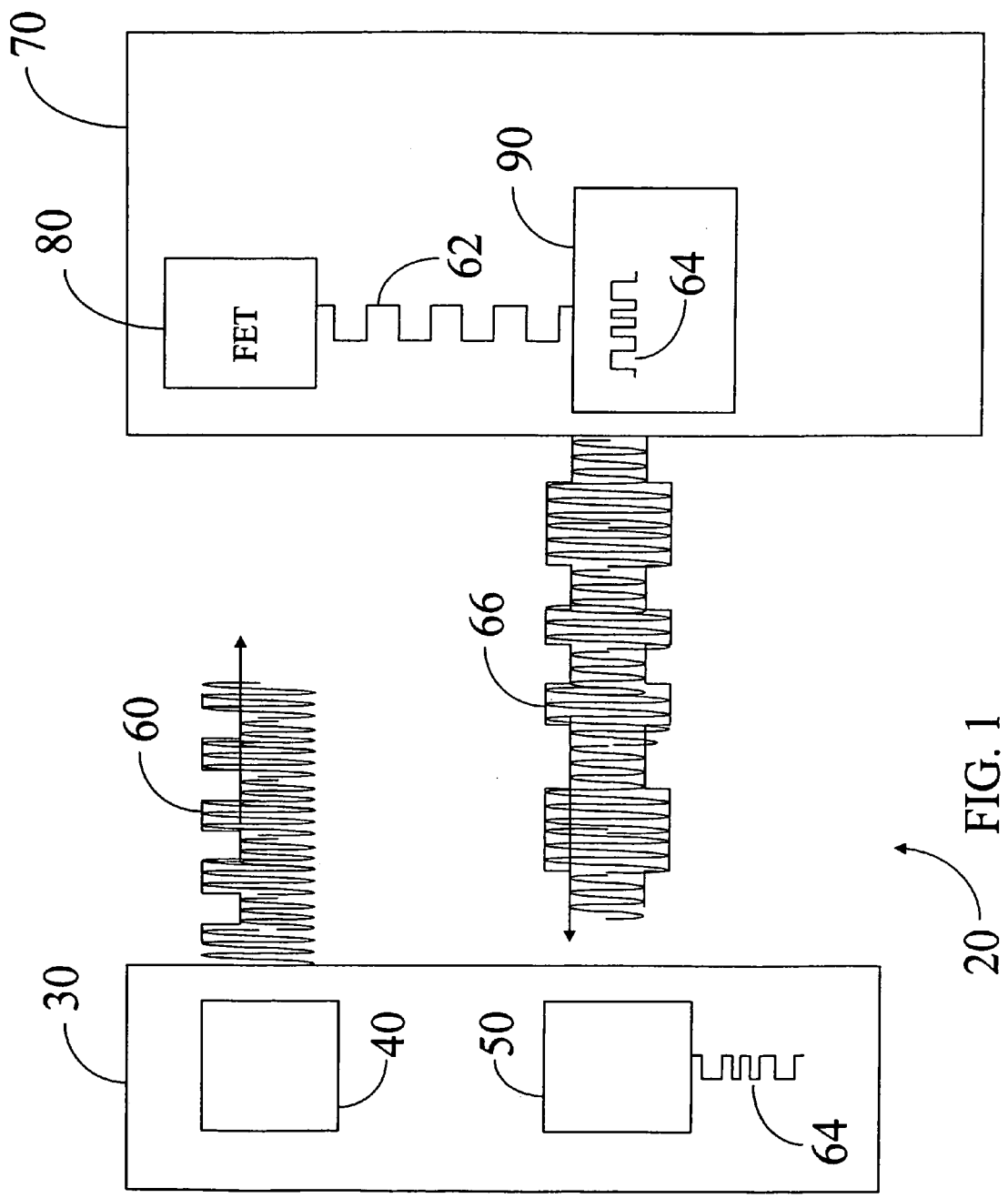
FIG. 1 illustrates schematically an embodiment of a radio frequency identification system in accordance with the present invention.

FIG. 1 illustrates schematically a radio frequency identification system 20 with a subcarrier modulated radio frequency carrier signal 60 emitted from a reader transmitting circuit 40, which is a portion of the reader circuit 30. A tag receiver circuit 80 is a portion of the tag circuit 70. Tag receiver circuit 80 receives the subcarrier modulated radio frequency carrier signal 60. The tag receiving circuit 80 also extracts the subcarrier modulation of the subcarrier modulated radio frequency carrier signal 60 and emits it as a clock signal 62. The tag receiving circuit 80 can be made, partially or completely, from organic semiconductor material. Organic semiconductor material has a maximum switching speed less than typical silicon semiconductor switching speeds. Electron and hole mobilities for organic semiconductors are less than the mobilities for silicon and other commonly used, non-organic semiconductors. Mobility, along with capacitance, largely define the switching speed for a given semiconductor technology. Switching speed sets the upper limit on the clock frequency that can be used. Current organic technology is limited to 1 KHz. Radio frequency identification systems generally use a carrier frequency of 125 KHz or more. The subcarrier frequency modulation rate on the radio frequency carrier signal 60 should be equal to or less than the 1 KHz switching speed of the organic semiconductor material comprising the tag receiver circuit 80 used to extract the subcarrier modulation for the clock. The use of low cost organic semiconductor materials and the simple manufacturing techniques required for such material allows for low cost fabrication of circuits made from organic semiconductor materials.

The clock signal 62 output from tag receiver circuit 80 is used in the tag transmitter circuit 90, a second portion of the tag circuit 70. A synchronous state machine not shown), which is part of the tag transmitter circuit 90, is used to retrieve stored data 64 in an orderly fashion. The stored data 64 bits (or bytes) are extracted in the predetermined order in which they are to be transmitted. The clock signal 62 controls the bit or symbol duration and the timing reference for the synchronous state machine that retrieves the stored data 64. In other words, the tag transmitter circuit 90 extracts the stored data 64 embedded in the tag transmitter circuit 90 and this data extraction is synchronized with the clock signal 62. The extracted data 64 is transmitted on the modulated backscattered signal 66, which is also synchronized with the clock signal. The reader receiver circuit 50, the second portion of the reader circuit 30, receives the extracted data 64.

As illustrated in FIG. 1, the data 64 can be encoded on the modulated backscattered signal 66 as amplitude modulation. Frequency shift keying and phase shift keying are other modulation techniques, which can be used to impress the data on the modulated backscattered signal 66. Encoding techniques, which can be used, include non-return to zero, differential bi-phase, and bi-phase L or Manchester encoding.

Once the modulated backscattered signal 66 is received by the reader receiver circuit 50 the data 64 is extracted by the reader circuit 30.

Figure 2:
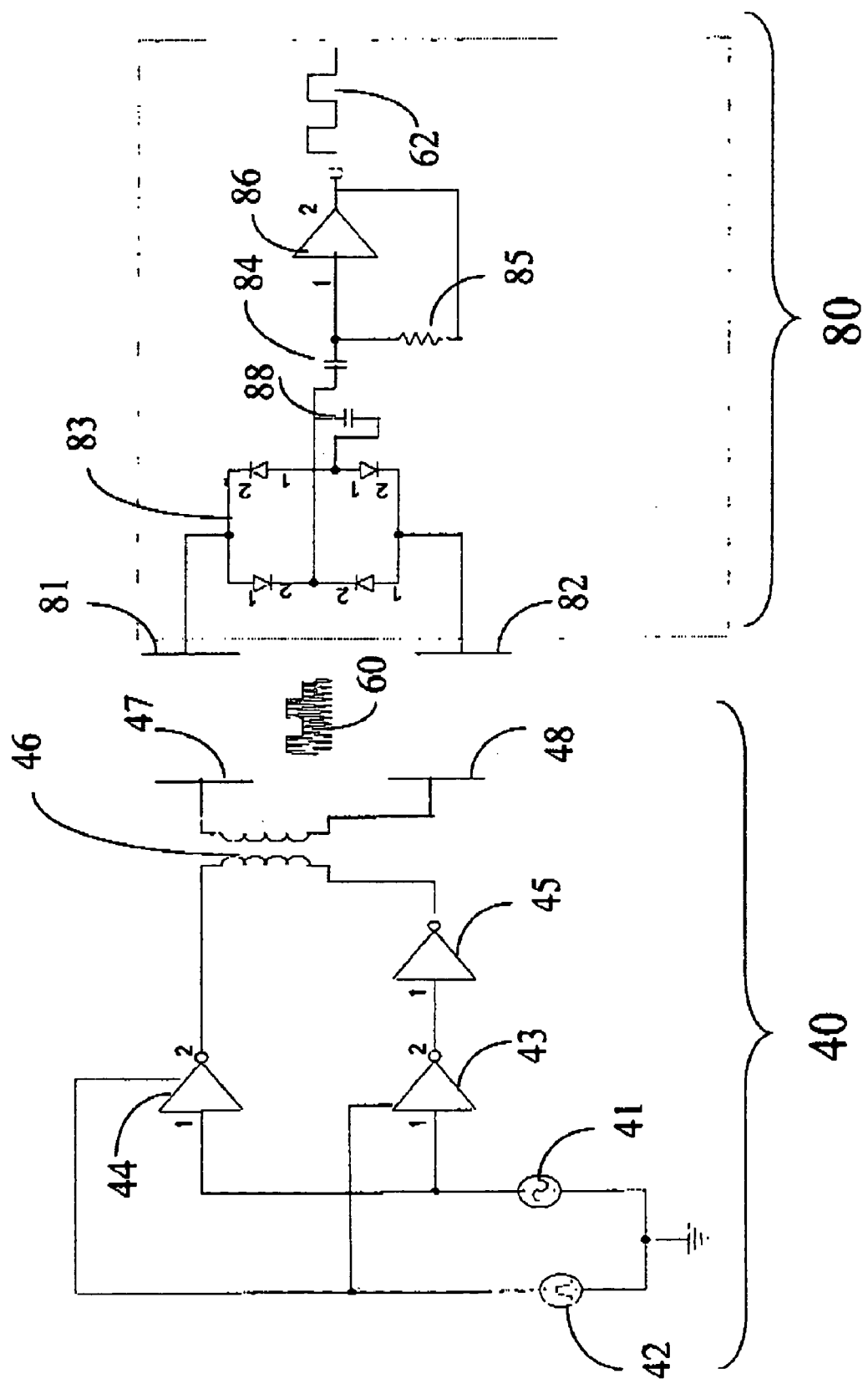
FIG. 2 illustrates a circuit diagram of a portion of the radio frequency identification system in accordance with the present invention.

A circuit schematic for the reader transmitter circuit 40 and the tag receiver circuit 80 are illustrated in FIG. 2. The first voltage source 41 generates the carrier signal and is typically driven with a 125 KHz sine wave for a radio frequency identification system. The second voltage source 42 generates the subcarrier at 1 KHz or less. The data rate of the subcarrier must be equal to or less than the highest rate that can be switched by the organic semiconductor material forming the tag receiver circuit 80. Both sources are input into first inverter 43 and second inverter 44. First inverter 43 is output into a third inverter 45 and the output of third inverter 45 and second inverter 44 drive a step up transformer 46 to increase the voltage. Non-parallel capacitor plates 47 and 48 are the output end of the reader transmitter circuit 40. They provide capacitive coupling between the reader transmitter circuit 40 and the tag receiver circuit 80. Tag receiver circuit 80 also has two non-parallel capacitor plates 81 and 82, which provide capacitive coupling to the reader transmitter circuit 40 when the reader transmitter circuit 40 and tag receiver circuit 80 are close enough for coupling to occur. In an alternate embodiment, the capacitive coupling between capacitor plates 47 and 81 and between capacitor plates 48 and 82 is replaced by coils to establish inductive coupling between the reader transmitter circuit 40 and tag receiver circuit 80.

When coupling of the subcarrier modulated radio frequency carrier signal 60 is established, capacitor plates 81 and 82 on tag receiver circuit 80 are input to opposite ends of a diode bridge 83. The diode bridge is formed from four diodes made out of organic semiconductor material. The diodes could also be implemented as a conventional semiconductor diode with the anode and cathode comprised of semiconductor material. Alternatively, the diodes could be formed by a Schottky junction or as diode connected FETs. The diode bridge 83 must be fast enough to pass at least some of the energy from the RF carrier signal. The output of the diode bridge 83 is loaded with capacitor 88 which filters off the RF carrier signal generated by the second voltage source 42. The voltage generated across capacitor 88 can be used to power the tag circuit 70 (FIG. 1). The output of the diode bridge 83 also drives a differentiator comprised of a capacitor 84, a resistor 85 and an inverter 86. The differentiator filters off the DC component of the rectified carrier signal generated by the first voltage source 41 to extract the clock signal 62 generated by the second voltage source 42. The clock signal 62 is output from the inverter 86. In the remainder of the circuit (not shown in FIG. 2) the stored data 64 is extracted by synchronizing the clock signal 62 to the stored data 64 and a modulated backscattered signal 66 is generated to transmit the data 64 to the reader receiver circuit 50 illustrated in FIG. 1.

The data extraction and modulated backscattered signal 66 generation done by the tag transmitter circuit 90 of FIG. 1 is achieved using standard circuit designs known to those of ordinary skill in the art. Likewise the functions of the reader receiver circuit 60 are known to those of ordinary skill in the art.

The tag transmitter circuit 90 can be formed from organic semiconductor material so that circuit 70 of FIG. 1 is completely organic. Organic semiconductor material is flexible. A flexible tag circuit 70 can be easily attached to packages with a variety of shapes including curved surfaces, making it a simple, low cost tag device to be used in radio frequency identification systems.

The resistors, capacitors, inverters, and FET's described here can be fabricated in a flexible form using organic semiconductor technology as taught in U.S. patent application Ser. No. 10/057,367 filed Jan. 25, 2002 (Motorola CML01491I) and U.S. patent application Ser. No. 10/034,337 filed Dec. 28, 2001 (Motorola CML1500I), both applications assigned to the assignee of this application.

Clearly, the illustrated embodiments of device 20 (FIG. 1) are meant to illustrate what can be fabricated for radio frequency identification systems. These illustrative embodiments are not intended to be exhaustive of all possibilities or to limit what can be fabricated for the aforementioned purpose. There is, therefore, a multiplicity of other possible combinations and embodiments. By using what is shown and described herein, a radio frequency identification system and a radio frequency identification tag are simpler to fabricate at low cost. Those having ordinary skill in the art will therefore appreciate the benefit of employing an embodiment of this radio frequency identification system.

We claim:

1. A radio frequency identification system comprising:
    a radio frequency identification reader circuit operable to emit a radio frequency carrier signal modulated with a subcarrier having a subcarrier modulation rate; and
    a radio frequency identification tag circuit comprising a field effect transistor formed from an organic semiconductor material that extracts the subcarrier from the emitted radio frequency carrier signal, wherein the subcarrier modulation rate is equal to or less than the switching rate of the field effect transistor and the extracted subcarrier functions as a clock operable to assist in the transfer of a modulated backscattered signal to the radio frequency identification reader circuit and wherein the modulated backscattered signal is decoded by the radio frequency identification reader circuit to obtain data encoded in the radio frequency identification tag circuit.

2. The system of claim 1, wherein the radio frequency carrier signal is amplitude modulated to impress the subcarrier upon the radio frequency carrier signal.

3. The system of claim 1, wherein the radio frequency carrier signal is phase modulated to impress the subcarrier upon the radio frequency carrier signal.

4. The system of claim 1, wherein the radio frequency carrier signal is frequency modulated to impress the subcarrier upon the radio frequency carrier signal.

5. The system of claim 1, wherein the modulated backscattered signal is transferred to the radio frequency identification reader circuit from the radio frequency identification tag circuit by inductive coupling.

6. The system of claim 1, wherein the modulated backscattered signal is transferred to the radio frequency identification reader circuit from the radio frequency identification tag circuit by capacitive coupling.

7. A method of operating a radio frequency identification system, comprising:
  emitting from a radio frequency identification reader a radio frequency carrier signal modulated by a subcarrier having a subcarrier modulation rate;
    extracting the subcarrier from the emitted radio frequency carrier signal by a first portion of a radio frequency identification tag circuit comprising a field effect transistor formed from an organic semiconductor material to obtain a clock signal, wherein the subcarrier modulation rate is equal to or less than the switching rate of the field effect transistor;
    extracting data stored on a second portion of the radio frequency identification tag circuit by synchronizing the clock signal to the stored data; and
    transmitting the extracted data to the radio frequency identification reader from the radio frequency identification tag circuit on a modulated backscattered signal.

8. The method of claim 7, further comprising:
sending the modulated backscattered signal to the radio frequency identification reader from the radio frequency identification tag circuit by capacitive coupling of the backscattered modulation signal.

9. The method of claim 8, further comprising:
sharing a capacitive coupling portion of the radio frequency identification tag circuit between the first portion of the radio frequency identification tag circuit and the second portion of the radio frequency identification tag circuit.

10. The method of claim 7, further comprising:
sending the modulated backscattered signal to the radio frequency identification reader from the radio frequency identification tag circuit by inductive coupling of the modulated backscattered signal.

11. The method of claim 10, further comprising:
sharing an inductive coupling portion of the radio frequency identification tag circuit between a first portion of the radio frequency identification tag circuit and the second portion of the radio frequency identification tag circuit.

12. The method of claim 7, further comprising:
using the clock signal to set a timing for the modulated backscattered signal to transit the extracted data to the radio frequency identification reader.

13. A radio frequency identification system, comprising:
means for emitting a subcarrier modulated radio frequency carrier signal from a radio frequency identification reader circuit, the subcarrier having a subcarrier modulation rate;

means for extracting the subcarrier from the emitted radio frequency carrier signal at a radio frequency identification tag circuit comprising a field effect transistor formed from an organic semiconductor material to obtain a clock signal, wherein the subcarrier modulation rate is equal to or less than the switching rate of the field effect transistor;

means for extracting data stored in the radio frequency identification tag circuit by synchronizing the clock signal to the stored data; and means for transmitting the extracted data to the radio frequency identification reader from the radio frequency identification tag circuit.

14. A radio frequency identification tag, comprising:

a first circuit comprising a field effect transistor formed from an organic semiconductor material operable to receive a subcarrier modulated radio frequency carrier signal the subcarrier having a subcarrier modulation rate equal to or less than the switching rate of the field effect transistor, wherein the first circuit is operable to extract the subcarrier from the received subcarrier modulated radio frequency carrier signal emitted from a radio frequency identification reader, and wherein the extracted subcarrier is a clock signal; and a second circuit operable to utilize the clock signal to extract data stored on the radio frequency identification tag by synchronizing the clock signal to the stored data, wherein the first circuit and the second circuit are in electrical communication.

15. The tag of claim 14, wherein the second circuit comprises an organic semiconductor material.

16. The tag of claim 14, wherein the clock signal has a clock rate that is equal to the subcarrier modulation rate.

17. The tag of claim 14, wherein the second circuit uses the clock signal to set a timing for a modulated backscattered signal, wherein the modulated backscattered signal transmits the extracted data.

18. A radio frequency identification tag circuit, comprising:
  means for receiving a subcarrier modulated radio frequency carrier signal emitted from a radio frequency identification reader, the subcarrier having a subcarrier modulation rate;
  means comprising a field effect transistor formed from an organic semiconductor material for extracting the subcarrier from the received subcarrier modulated radio frequency carrier signal to obtain a clock signal, wherein the subcarrier modulation rate is equal to or less than the switching rate of the field effect transistor;
  means for extracting data stored in the radio frequency identification tag circuit by synchronizing the clock signal to the stored data; and
  means for transmitting the extracted data to the radio frequency identification reader from the radio frequency identification tag circuit.

* * * * *